Feb. 1, 1966   E. P. RIPLEY   3,233,018
METHOD AND APPARATUS FOR FABRICATING CONCRETE BLOCKS
Filed May 22, 1961   2 Sheets-Sheet 1
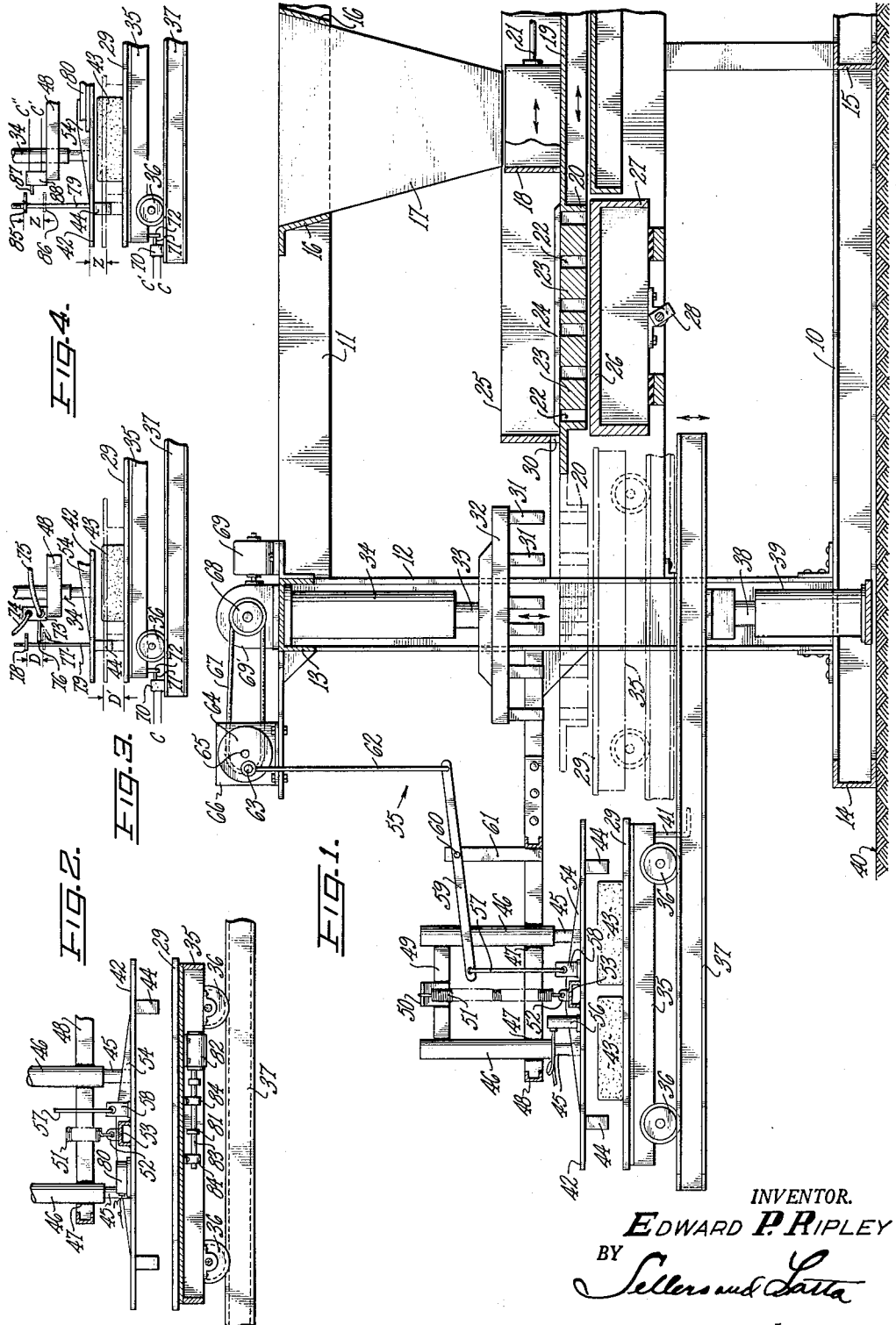
INVENTOR.
EDWARD P. RIPLEY
BY Sellers and Latta
ATTORNEY

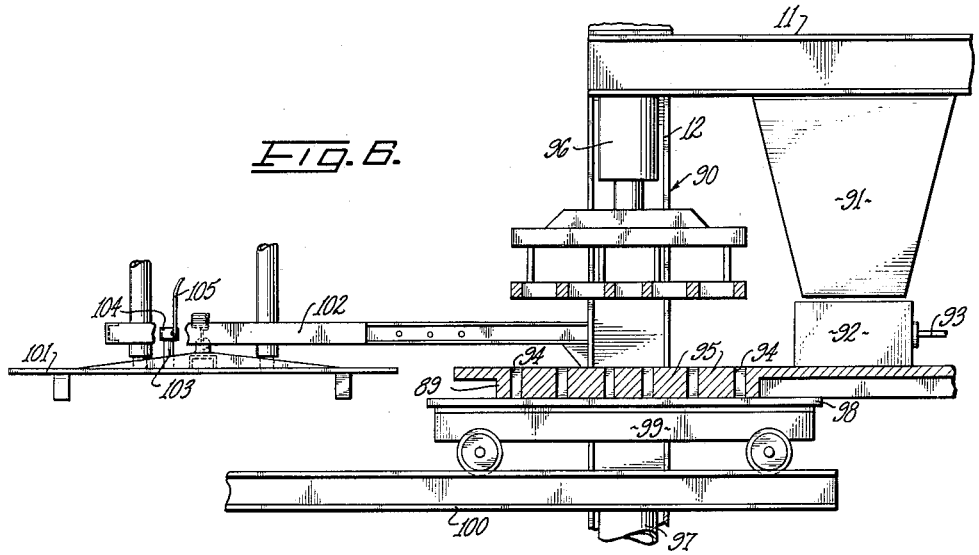
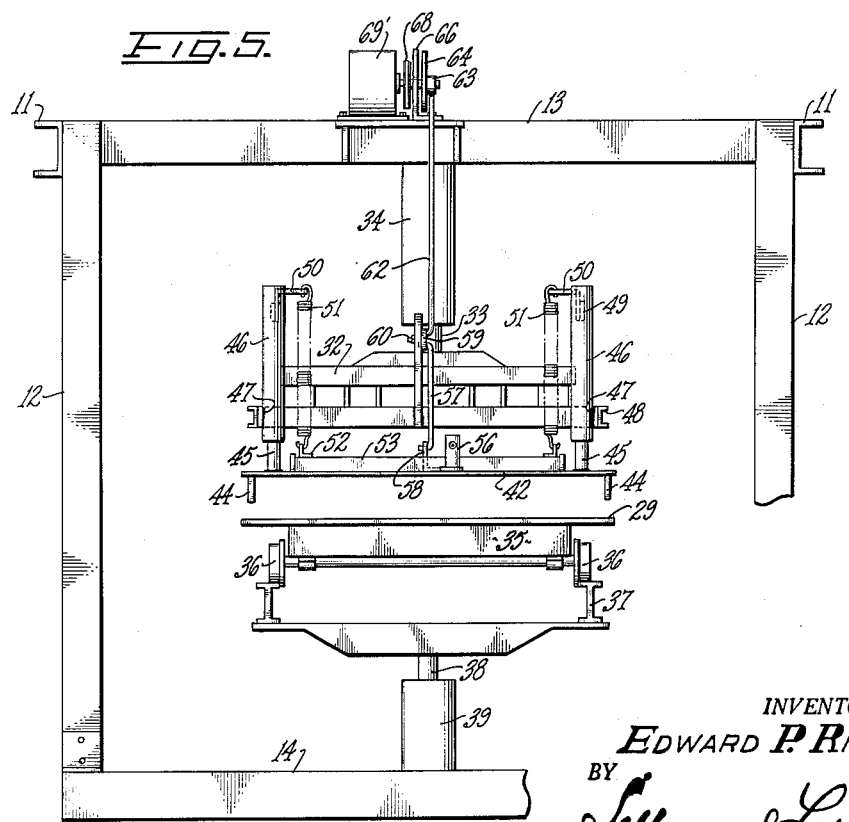

United States Patent Office 3,233,018
Patented Feb. 1, 1966

3,233,018
METHOD AND APPARATUS FOR FABRICATING CONCRETE BLOCKS
Edward P. Ripley, 6308 Orion, Van Nuys, Calif.
Filed May 22, 1961, Ser. No. 111,634
12 Claims. (Cl. 264—69)

This invention relates to the manufacture of concrete structural blocks. The general object of the invention is to provide an improved apparatus and methods for fabricating a block having a lateral surface of irregularly bulging contour. Like stone with a chipped finish, such blocks provide a soft, pleasing surface effect in a building wall constructed therefrom, as contrasted to the hard, unattractive finish presented by conventional flat sided concrete block wall structure.

One of the important objects of the invention is to provide apparatus and methods for fabricating such structural blocks inexpensively, so that they may be sold competitively. Another object is to provide methods for rapid quantity production of such structural blocks.

Another object is to provide both apparatus and methods of fabrication whereby such blocks may be fabricated from either a wet or dry concrete mix.

A further object is to provide apparatus and methods for fabricating such blocks, wherein the bulged surfaces produced thereby are irregular and varied so as to avoid any monotonous regularity or recurrence of details of surface design.

In general, the invention contemplates apparatus and methods for fabricating structural blocks of the type indicated, wherein the blocks are first cast in flat sided rectangular mold cavities, and immediately after removal from the cavities and while the concrete is still green, are slightly compressed between parallel horizontal flat surfaces in conjunction with vibrating means, down to a reduced thickness of predetermined magnitude whereby the blocks are squashed to produce the bulging lateral surfaces thereof.

The invention also contemplates the possibility of molding the blocks with either a wet or dry concrete mix directly on a pallet, functioning as the bottom of the mold, with the use of vibration to assure consistent quality control during the compression operation.

One of the important aspects of the invention is the provision for molding, slumping, transporting and curing the blocks while they remain in uniformly upright condition, avoiding any necessity for turning the blocks over between the molding operation and the slumping operation. This provides for high speed, high quantity production in which the molding operation may be carried out on a more or less automatic, high capacity machine, and in which the slumping operation may be immediately performed at the discharge end of the machine, by apparatus including vibrating means and which may be either attached to said discharge end or separate therefrom, but located adjacent to such discharge end.

Other objects and advantages will become apparent in the ensuing specification and appended drawings, in which:

FIG. 1 is a side view, partially in section, of the molding and block slumping portions of an apparatus embodying the invention;

FIG. 2 is a side view, partially in section of an alternative form of the block slumping portion of the apparatus of the invention;

FIG. 3 is a fragmentary view of a portion of the apparatus showing one form of control for the vibrator means thereof;

FIG. 4 is a fragmentary view similar to FIG. 3 showing another form of control for the vibrator means;

FIG. 5 is a rear end view of the apparatus of FIG. 1; and

FIG. 6 is a side view of a modified form of the apparatus shown in FIG. 1.

THE APPARATUS

The apparatus of the present invention, in general, incorporates certain features of conventional block molding apparatus, which are illustrated somewhat in skeleton form, for the sake of simplicity. The form shown in FIGS. 1 and 5 has its basic features more fully disclosed in my Reissue Patent No. 24,527, issued on August 26, 1958.

The block fabricating apparatus shown in FIGS. 1 and 5 includes a frame structure for supporting the various parts of the apparatus. The entire frame is not illustrated herein, but sufficient structure is shown to indicate the general connection between the parts. The frame may include a pair of bolsters 10, a pair of head rails 11; bolsters 10 and head rails 11 being disposed at the respective sides of the machine and extending longitudinally thereof. Bolsters 10 and head rails 11 are vertically connected by post members 12, and transversely connected by cross beams 13, 14, 15 and 16.

This form of the apparatus includes a hopper 17, supported on cross beams 16, through which a green concrete mix is delivered to an open-bottom feeder box 18 which travels back and forth on a horizontal apron 19 of a mold frame 20 by means of power transmitter from a suitable source (not shown) through a push rod 21. As the feeder box 18 moves to the left, as viewed in FIG. 1, its charge of concrete mix is deposited in the open cavities 22 defined by core sections 23 supported on support bars 24. During such movement, the feeder box 18 is confined between a retainer wall 25 which forms a barrier restricting the flow of the concrete mix from the feeder box 18 to the area occupied by the cavities of the mold frame. Below the mold frame 20, and forming a bottom therefor, is a bed 26 having a frame 27 to which is connected an unbalanced rotating vibrator 28 which functions to cause the green concrete to flow into the cavities 22 and be firmly compacted therein.

The mold frame 20 is slidable horizontally over the bed 26, from the concrete receiving position shown in full lines in FIG. 1 to a discharge position shown in dashed lines, in which position it is ready to release the green blocks from mold cavities 22 onto a pallet 29. Notches 30 are formed in retainer wall 25 to permit passage of core support bars 24 during such motion.

An ejector unit is provided above the discharge position of the mold frame which comprises a series of ejector fingers 31 which are mounted on an ejector head 32 in laterally spaced relation corresponding to the spacing of the mold cavities 22, each ejector finger 31 registering with a respective mold cavity 22. Ejector head 32 is attached to the lower end of a piston rod 33 forming part of a hydraulic jack 34, the latter having an overhead suspension in the frame of the apparatus. The ejector head 32 is adapted to be moved vertically by jack 34, with a downward movement for pushing the green blocks out of the mold cavities 22 onto the pallet 29; and with an upward movement to withdraw the ejector fingers 31 from mold cavities 22 so as to allow the mold frame 20 to be returned to the receiving position. These vertical movements are indicated by the double arrow in FIG. 1.

In the molding and ejecting operations, and in the slumping operation, which will be shortly referred to, the pallet 29 is carried by a suitable conveyor such as a chain or belt conveyor, or a cart 34 having wheels 36 movable on rails 37 extending longitudinally of the machine. Rails 37 are mounted, for vertical movement, upon a piston rod 38 forming part of a hydraulic jack 39, the lower end of which is supported in the frame of the machine near the ground level indicated at 40 in FIG. 1. Cart 36 is coupled to a suitable actuating mechanism (not shown), through a hitch 41 for movement from the receiving position, in which the cart is shown in dotted lines, to a slumping position in which the cart is shown in solid lines. In the receiving position, the rails 37 are elevated so as to present the cart-supported pallet 29 to the lower side of mold frame 20, just clearing the lower side of the mold frame, as indicated in dotted lines. Jack 34 of the ejector head 32 and jack 39, supporting rails 37, are operated in synchronism on the downward motion of ejector head 32, thereby permitting the green blocks to be deposited on pallet 29 with cart 35 disposed on rails 37, as shown in the solid line position in FIG. 1. The ejector head 32 is then retracted in an upward direction by hydraulic jack 34. Cart 35, carrying pallet 29, upon which the rectangularly shaped green blocks are positioned, is then free to move to the left to the solid line position of the cart shown in FIG. 1, where it will be positioned beneath the horizontal slumping plate 42.

In the slumping position, the blocks 43 are supported, stationary, by the pallet 42, while pressure is applied between the upper faces and lower faces of the blocks by means of the horizontal slumping plate 42, moving downwardly to a predetermined level below the original plane of the upper faces of the blocks. This terminal level of the slumping plate 42, in its downward movement, is accurately determined by the engagement of stop fingers 44, projecting downwardly from the side margins of the slumping plate 42 and engaging against the upper face of pallet 29 in marginal areas thereof outside the area occupied by the blocks 43.

The slumping plate 42 is provided with four equilaterally spaced upstanding guide rods 45 which are telescopically received in similar guide sleeves 46, which are suitably secured at 47, as by welding, to a fixed rectangular supporting frame 48. Cross members 49 are secured between the upper ends of the fixed tubular members 46, and are provided with centrally positioned brackets 50 to which biasing springs 51 are secured at their upper ends. The lower ends of springs 51 are attached to brackets 52 secured on a channel member 53, extending between reinforcement plates 54. In this manner, the slumping plate is normally biased upwardly by springs 51 above the upper faces of blocks 43 as they are wheeled into position on cart 35, beneath plate 42 in preparation for the slumping operation.

To effect proper slumping of the rectangularly formed blocks without the occurrence of fissures, which frequently result when only pressure is utilized to compress the blocks, means, such as a power driven linkage 55, is provided for effecting relative vertical movements between the pallet and the slumping plate 42, and a vibrator 56, of conventional construction including a reciprocating, air driven, piston is provided on the slumping plate 42 to promote reorientation of the concrete particles of the green blocks as downward pressure is applied to the blocks by slumping plate 42.

The power driven linkage 55 includes a link 57, pivotally connected at one end to an upstanding bracket 58 secured to the slumping plate 42 and pivotally connected at its other end to one end of a walking beam 59 centrally pivoted at 60 to an upstanding support member 61, secured to the fixed support frame 48. The other end of beam 59 is pivotally joined to the bottom end of a link 62 having its other end pivotally connected to an eccentric trunnion 63 on an eccentric driving disc 64. Eccentric disc 64 is mounted on a shaft 65 journalled in a bracket 66 secured to the frame of the apparatus. The disc 64 is driven by a chain or belt 67, which is connected to a clutch 68 driven through a low r.p.m. reduction gear 69' by a motor 69. Clutch 68 is a conventional, one revolution type, and its operation causes the power linkage 55 to slowly move the slumping plate from its upper position to its lower point of travel and back again to its upper position.

In the use of the invention as shown in FIG. 1, the blocks 43 are formed from a "wet" concrete mix. Hence, it is desirable to impart vibrations only to the top of the blocks during the slumping operation. Otherwise, the blocks will tend to spread and flow in the bottom areas, and an excessive amount of water will be extracted from the blocks, thus producing both a block of undesirable configuration and poor mechanical strength. In order to avoid such an occurrence, a control system such as that depicted in FIG. 3 may be utilized to avoid imparting vibrations to the pallet 29 which would otherwise be transferred to the blocks, therethrough.

The control system shown in FIG. 3, applicable to the apparatus as shown in FIG. 1, includes an electrical switch 70 having an operating button 71 which is moved inwardly to the energizing position upon being contracted by a depending member 72 on the frame of the cart 35 when the cart moves to the left as seen in FIG. 1, into proper position beneath the slumping plate 42 in preparation for the slumping operation. Leads C from switch 70 are so connected as to energize both a conventional compressor or other source, (not shown) supplying compressed air for operation of the vibrator 56, and to supply power to the motor 69 for operating clutch 68 for actuation of the operating linkage 55 for the slumping plate 42. Hence, when the cart 35 is in position and switch 70 has been actuated, the slumping plate 42 starts on its downward movement from the solid line position shown in FIG. 3, with vibrator 56 in operation. A normally open valve 73, secured to fixed support frame 48, supplies compressed air from a source (not shown) through flexible input conduit 74 and flexible output conduit 75 to the vibrator 56, upon actuation of switch 70. The valve 73 is provided with an upwardly biased actuator 76 which closes the valve 73 when moved to the position 77, shown in dash lines. Actuator 76 is depressed to position 77 by a projection 78 on an actuator rod 79 attached to the slumping plate. The projection 78 comprises a nut which may be adjustably positioned on the threaded end of rod 79 to a point whereby the distance D it must travel to close valve 73, is slightly less than the distance D', the stop fingers 44 travel before contacting the top of pallet 29. In this manner, the vibrator 56 is turned off just prior to contact of stop fingers 44, with pallet 17 thereby avoiding the undesirable vibration of the pallet when a "wet" mix is used for molding blocks 43.

When it is desired to utilize the apparatus of FIG. 1, or FIG. 6, to be described later, with the use of a "dry" type concrete mix for molding blocks 43, the slumping arrangement shown in FIG. 2 may be employed. With the use of such a concrete mix, it is desirable to vibrate both the slumping plate 42 and the pallet 29 due to the stiffer texture of the concrete mix. In order to provide sufficient vibration of the green blocks, to avoid the formation of unsightly cracks or weakening fissures, both the cart 35 and slumping plate 42 are equipped with vibrating means. The slumping plate, in this modification, is equipped with a vibrator which may be a conventional reed type electrical vibrator, indicated at 80, while the cart 35 is provided with a vibrator comprising an eccentric disc 81 which is driven by an electric motor 82 through a shaft 83 journalled in bearing members 84. With this arrangement, both the pallet 29 and slumping plate 42 are caused to vibrate when the cart 35 moves into position for the slumping operation and actuates switch 70.

FIG. 4 shows a control arrangement for such operation of the apparatus. Here, the switch 70 is actuated in the same manner by the position of cart 35 as in FIG. 3.

However, in this case switch 70, through leads C, C' and C" and a switch 88, in series with switch 70, cause operation of both motor 82 and the vibrator 80, in addition to the motor 69 and the single revolution clutch 68. In lieu of the projection 78 in FIG. 3, an adjustable hinged projection 85 is provided on rod 79 which moves to the dashed line position 86 on the downward movement of the slumping plate 42, without actuation of the downwardly biased lever 87 of switch 88. However, since projection 85 is limited to upward hinge action, the actuator button 87 will be moved to a position to de-energize switch 88 upon upward movement of slumping plate 42, thereby turning off both the vibrators 80 and 81 and power linkage 55 when slumping plate 42 is moving upwardly on its return movement. It is especially important that the pallet vibrator 81 be stopped at this stage, to avoid further slumping of the blocks on the pallet after the slumping plate has moved out of contact with the blocks. However, as a further alternative arrangement, the switch 88 may be utilized to cut out only the pallet vibrator 81, leaving the other parts subject to the sole control of switch 70.

A more simplified and expedient block manufacturing apparatus is shown in FIG. 6. Here the arrangement is similar to that described in conjunction with the apparatus of FIG. 1. However, in this case the mold frame 89 is fixed in position beneath the ejector mechanism 90, and may be supplied, in a suitable manner, with a vibrator mechanism similar to that identified at 28 in FIG. 1. With this arrangement, the hopper 91 delivers a charge of green concrete to the reciprocating feeder 92 which may be moved to the left by means of push rod 93 to discharge the concrete into the cavities 94 between core members 95 of the mold frame 89, with the assistance of vibrations, as mentioned above, in a manner similar to that employed in the apparatus of FIG. 1. Since the mold frame 89 is stationary, the hydraulic jacks 96 and 97 may be operated in a synchronism to position the ejector 90 in its elevated position while the feeder discharges the concrete into the cavities 94. The pallet 98 on cart 99 is positioned immediately beneath the mold frame by elevation of rails 100 by hydraulic jack 97. After the feeder 92 is retracted to the right from beneath the ejector mechanism 90, the two hydraulic jacks 96 and 97 are operated to lower the ejector mechanism to push the molded blocks from the mold frame onto the simultaneously downwardly moving pallet 98 on cart 99. When the green blocks are free from the mold frame 89 and deposited on the pallet 98, the ejector hydraulic jack 96 may be elevated and the cart 88 carrying the green blocks may be moved to the left to the slumping position beneath the slumping plate 101. The slumping plate 101 is supported for movement in an up and down direction, and activated in such directions on a fixed frame member 102 by means similar to that described in conjunction with the apparatus of FIG. 1. Additionally, the slumping plate 101 is provided with a vibrating means 103 which includes an eccentrically spinning ball in a housing 104, which is activated by compressed air, introduced through a flexible conduit 105, and its operation controlled in a manner similar to and utilizing the same mechanism, described in conjunction with the control system of FIG. 3.

In lieu of the vibrational methods described above, the invention further contemplates, in another modified form thereof, the transmission of vibrations to the blocks (after removal from the mold) solely through the pallet, as the blocks are squeezed between the pallet and the slumping plate. In this instance, the slumping plate is not vibrated. Means such as shown in FIG. 2 for vibrating the pallet (e.g. through the conveyor cart) may be employed in this variation of the method, and the slumping plate 42, without any vibrating means thereon, may be employed for merely applying pressure to the blocks.

While not shown herein, it is to be understood that appropriate stacking and handling apparatus may be incorporated with either of the machines shown in FIG. 1 or 6 for removing the pallets carying the compressed blocks from the slumping position to a storage position for curing the blocks. An example of such apparatus is fully described in my above mentioned Reissue Patent No. 24,527.

METHODS OF FABRICATION

My improved methods of fabricating structural blocks may be effected in conjunction with the use of the apparatus of FIGS. 1 and 6 when it is desired to utilize a "wet" type concrete mix. As previously mentioned any combination of the various forms of vibrators, electrical or mechanical, may be incorporated in the structure of the various carts or slumping plates described, by one skilled in the art, depending upon the types of concrete mix utilized and the types of components available. In general, my improved methods embody the following steps:

(1) The desired concrete mix is prepared for introduction to hoppers 17 or 91 by any suitable conveyor means (not shown).

When using the apparatus as depicted in FIG. 1 or 6, a "wet" type mix would be prepared in accordance with the proportions and steps described in my reissue application No. 24,527. In the event the slumping arrangement disclosed in FIG. 2 is utilized, or variations thereof, as described above, a "dry" type mix corresponding to a "dry" mix as designated by one skilled in the art, may be employed. Such a mix would be varied in the proportions of cement, aggregate and water to meet the requirements for "wet" and "dry" mixes.

(2) In the next operational step, the concrete mix, "wet" or "dry," is molded in the mold frames 20 or 89, under vibration, to impart to the blocks their general shape, but with flat, squared sides and ends.

In the operation of the devices shown in FIG. 1, to accomplish this step of the method, the feeder 18, with its charge of concrete, is moved between retainer walls 25, while mold frame 20 is disposed in the retracted or loading position shown in full lines, above vibrator portion 27, which forms a bottom therefor. The vibrator device 28 is set in rotation to vibrate the vibrator portion 27 as the cement is pushed and dropped into the mold cavities 22 by the feeder 18. After delivering the fresh concrete to the mold cavities 22, and while the vibrating process continues, feeder 18 is retracted to its starting position, shown in full lines in FIG. 1, withdrawing a portion of the excess concrete lying above the level of the upper face of the mold frame 20. With the use of the apparatus of FIG. 6, this step of fabrication is identical.

(3) In the next operational step, the blocks are transferred from the mold frames to pallets upon which they are subsequently transported, further processed, handled, and cured.

With the apparatus of FIG. 1, this step is accomplished by movement of the mold frame 20, from the right as seen in FIG. 1 to a position beneath ejector head 32. The rails 37 carrying cart 35 are then raised by hydraulic jack 38 so that pallet 29 is beneath the mold frame 20. The hydraulic jacks 34 and 38 are then operated downwardly in synchronism, to permit the ejector fingers 31 to push the formed blocks from cavities 22 onto pallet 29, on the cart 35, with the cart rails 37 in the solid line position. The hydraulic jack 34 may then raise the ejector head 32 free of the green blocks and permit movement of the cart to the left into the slumping position beneath the slumping plate 42. In the embodiment shown in FIG. 6, the procedure is the same, with the exception of the necessity of moving the mold frame into position beneath the ejector head, since the mold frame 89 is permanently fixed in position below ejector 90 in this form of the apparatus.

(4) In the next operational step, the blocks, while still supported upon the pallet, are subjected to controlled pressure from slumping plates 42 or 101, while simultaneously, vibrations are imparted to the blocks.

This step is accomplished, when a "wet" type mix is utilized, by imparting vibrations through the slumping plate only, using the apparatus of FIGS. 1 and 6, in conjunction with the control arrangements of FIGS. 3 and 4. Here, the slumping plates 42 and 101 are actuated by switches 70 or 88 upon arrival of the carts into the slumping positions. When a "wet" type mix is used for the formation of the blocks, the vibrator arrangements of FIGS. 1 and 6 may be used, and when a "dry" type mix is used, an arrangement similar to that shown in FIG. 2 may be employed.

(5) In the next step of the process, the pallets carrying the green blocks, in their slumped or compressed condition, may be removed from the carts and stacked in a storage area for curing in a manner as described in my above mentioned Reissue Patent No. 24,527.

The term "structural," as used herein, is intended to have a broad meaning embracing both structural blocks (as the term is conventionally used in the art) and veneer type blocks.

In conclusion, it may be said that outstanding characteristics of the apparatus and processes of this invention produce blocks with an infinite number of variations of surface texture between blocks coming successively out of the same mold, or, to state it somewhat differently, no two blocks will be identical, due to the unrestrained bulging of the sides thereof that are to be exposed in the building structures utilizing the blocks. It is to be understood that, by confining the back side and one or both ends of a block, the bulging effect can be limited to the front side, or the front side and one end, or any number of sides less than the full four sides (two sides and two ends) of a block.

It is to be understood that the disclosure of the invention herein is exemplary of preferred forms. Variations may be made in the specific shape, form and configurations of the various parts of the apparatus and the various steps of the process, to meet particular needs of manufacture or quality of structural blocks desired, without departing from the spirit and scope of the invention. The foregoing disclosure is to be interpreted in an illustrative rather than a limiting sense and to be accorded the full scope of the appended claims.

I claim:

1. Apparatus for fabricating concrete blocks, comprising: a pallet; means for loosely supporting said pallet for travel between a receiving position and a slumping position; means to deposit on said pallet, while in said receiving position, a series of green concrete blocks; a slumping plate disposed over said slumping position; means for effecting relative vertical movement between said slumping plate and pallet; vibrating means for imparting vibrations to said green concrete blocks during at least a portion of said movement, whereby said green concrete blocks are compressed and slumped while development of fissures in in the blocks is inhibited, as a result of said movement and said vibrations to reduce the thickness thereof and thereby to cause the sides of said blocks to bulge to a desired irregularly rounded contour to provide a block of pleasing appearance and compact structure.

2. Apparatus for fabricating concrete blocks as defined in claim 1, wherein: said slumping plate is provided with stop means for contacting said pallet when the desired degree of compression of said blocks is attained.

3. Apparatus for fabricating concrete blocks as defined in claim 2, wherein: said vibrating means is positioned only on said slumping plate, whereby the vibrations are imparted only to the blocks from the top surfaces thereof.

4. Apparatus for fabricating concrete blocks as defined in claim 3, wherein: control means is provided to stop said vibrations immediately prior to contact of said stop means with said pallet, whereby to avoid vibrations being imparted to said blocks from the lower surface thereof, through said pallet, by contact of said stop means with said pallet while subject to such vibrations.

5. Apparatus for fabricating concrete blocks as defined in claim 1, wherein said vibrating means includes vibrator devices for vibrating both said slumping plate and said pallet, thereby imparting vibrations to said blocks from both the top and bottom surfaces thereof.

6. Apparatus for fabricating concrete blocks, comprising: a pallet; a roller mounted cart for supporting said pallet; a track on which said cart is mounted for travel between a receiving position and a slumping position; means for raising and lowering said track, said track being raised when the cart supporting said pallet is in the receiving position; means to deposit on said pallet, while in said receiving position, a series of green concrete blocks having flat side and end wall configuration; a slumping plate disposed over said slumping position; means for lowering said slumping plate downwardly against the blocks supported by the pallet when in the slumping position on said cart; vibrating means for vibrating said green concrete blocks during application of downward pressure to the blocks by said slumping plate, thereby causing said blocks to slump to reduced thickness and a configuration wherein at least some of said side and end walls are caused to bulge outwardly to a desired irregularly rounded contour while said blocks are compacted into a dense structural formation as a result of said vibrations and the simultaneously applied pressure between said slumping plate through said blocks to said pallet; stop means acting between said pallet and slumping plate to positively limit their relative approach when the distance between them has been reduced to a selected minimum; and control means to stop said vibrations immediately prior to operation of said stop means, whereby to prevent the transmission of vibrations between said pallet and slumping plate through said stop means.

7. Apparatus for fabricating concrete blocks as defined in claim 6, wherein said vibrating means consists in a vibrator device on said slumping plate.

8. Apparatus for fabricating concrete blocks, comprising: means for delivering a concrete mix to cavities of a mold frame in a first position for forming therein green concrete blocks having flat side and end walls; said mold frame being movable to a second position; an ejector mechanism above said second position; track means; a pallet; a cart movable on said track means and carrying said pallet; said cart being positionable beneath said mold frame in said second position; means for simultaneously moving said ejector mechanism, track means, and said cart bearing said pallet downwardly in said second position whereby said green concrete blocks are ejected by said ejector mechanism onto said pallet from said mold frame cavities, the mold frame being restricted to movement in a single plane; said cart bearing said pallet and said green concrete blocks being movable on said track means to a third position; a slumping plate above said third position; means for moving said slumping plate toward said pallet to a point less than the thickness of said green concrete blocks as ejected from said mold frame upon said pallet; vibrating means on said pallet for imparting vibrations to said green concrete blocks while in said third position during said movement of said slumping plate toward said pallet, whereby at least some of said flat walls of said blocks are caused to assume a desired irregularly rounded contour without development of fissures in the blocks; stop means attached to said slumping plate, projecting downwardly therefrom, and engageable with said pallet to limit slumping of the blocks below a selected heighth; and control means to stop said vibrations immediately prior to contact of said stop means with said pallet, whereby to avoid vibrations being imparted to the lower faces of said blocks through said pallet, by said stop means.

9. Apparatus for fabricating concrete blocks comprising: a fixed mold frame having cavities therein for forming at least one green concrete block having flat side and end walls, means for depositing a green concrete mix in said cavities; an ejector device movable in a direction toward and away from said mold frame; means on said ejector device for expelling said green concrete block from said cavities onto a pallet positionable beneath said mold frame; carrying means for supporting said pallet, and said carrying means being movable with said pallet and said green concrete block thereon to a slumping position beneath a slumping plate; means for moving said slumping plate toward said pallet to a distance in respect thereto less than the height of said green concrete block as deposited on said pallet by said ejector device; whereby said green concrete block is caused to assume a configuration wherein said flat walls bulge to a desired irregularly rounded contour; and means for vibrating said pallet during at least a portion of the operation of bulging said block by said slumping plate so as to effect said slumping without creating fissures in said block.

10. Steps in a method of fabricating concrete structural blocks with irregularly rounded side faces, comprising: preparing a concrete mix of moderately wet consistency and having a high degree of fines, so as to maintain a high degree of coherence in the green molded blocks; molding the green blocks in the approximate form of the finished blocks but wtih flat squared sides; placing the green blocks on flat supporting pallet; transporting the pallet to a position beneath a flat slumping plate parallel to the pallet, and moving the plate downwardly and applying pressure therethrough to the upper faces of the blocks while at least one side of each block is unconfined to reduce the thickness of the blocks; applying vibrations to said blocks durin the application of pressure thereto; thereby to attain a desired irregularly rounded side face contour rapidly without the development of fissures in said blocks; and then allowing the blocks to cure while remaining upon the pallet.

11. Steps in a method of fabricating concrete structural blocks with irregularly rounded side faces, comprising: molding green blocks in the approximate shape of the finished blocks but with flat squared sides; supporting the green blocks on a flat horizontal surface with at least one side of each block unconfined; applying controlled, continuous pressure through a flat plate, maintained parallel to said supporting surface, in a single downward movement of said plate, to the upper faces of the blocks as thus supported to reduce the thickness of the blocks and simultaneously applying vibrations to said blocks to cause the sides of the blocks to bulge to a desired degree of irregularly curved contours as a result of the simultaneously applied pressure and vibrations while inhibiting the development of fissures in the blocks; and allowing the blocks to cure.

12. Steps in a method of fabricating concrete structural blocks with irregularly rounded side faces, comprising: molding green blocks in the approximate shape of the finished blocks but with flat squared sides; supporting the green blocks on a flat horizontal surface with at least one side of each block unconfined; applying controlled, continuous pressure through a flate plate, maintained parallel to said supporting surface, in a single downward movement of said plate, to the upper faces of the blocks as thus supported to reduce the thickness of the blocks and simultaneously applying vibration to said blocks to cause the sides of the blocks to bulge to a desired degree of irregularly curved contours, and allowing the blocks to cure.

References Cited by the Examiner

UNITED STATES PATENTS

| | | | |
|---|---|---|---|
| Re. 24,527 | 8/1958 | Ripley | 25—155 |
| 2,685,116 | 8/1954 | Schutt | 25—41 |
| 2,825,954 | 3/1958 | Ripley | 25—2 |

ROBERT F. WHITE, *Primary Examiner.*

WILLIAM J. STEPHENSON, MICHAEL V. BRINDISI, MORRIS LIEBMAN, ALEXANDER H. BRODMERKEL, *Examiners,*